(12) United States Patent
Okada (10) Patent No.: US 8,932,380 B2
(45) Date of Patent: Jan. 13, 2015

(54) DUST REMOVAL DEVICE

(75) Inventor: Takayuki Okada, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 120 days.

(21) Appl. No.: 13/824,677

(22) PCT Filed: Oct. 6, 2010

(86) PCT No.: PCT/JP2010/067515
§ 371 (c)(1),
(2), (4) Date: Mar. 18, 2013

(87) PCT Pub. No.: WO2012/046309
PCT Pub. Date: Apr. 12, 2012

(65) Prior Publication Data
US 2013/0180222 A1  Jul. 18, 2013

(51) Int. Cl.
*B01D 46/00* (2006.01)
*B01D 46/52* (2006.01)
(Continued)

(52) U.S. Cl.
CPC ........ *B01D 46/0023* (2013.01); *B01D 46/0005* (2013.01); *B01D 46/525* (2013.01); *B01D 46/0032* (2013.01); *B01D 46/521* (2013.01); *G03B 21/16* (2013.01); *B03C 3/017* (2013.01); *B03C 3/155* (2013.01); *B03C 3/28* (2013.01); *Y10S 55/39* (2013.01)
USPC ............. 55/482; 55/488; 55/503; 55/DIG. 39

(58) Field of Classification Search
CPC ........... B01D 46/0002; B01D 46/0005; B01D 46/0023; B01D 46/0024; B01D 46/0032; B01D 46/521; B01D 46/525
USPC .......................................... 55/482, 488, 503
See application file for complete search history.

(56) References Cited

U.S. PATENT DOCUMENTS 5,582,146 A * 12/1996 Linsbauer et al. ........ 123/198 E
6,986,804 B2 * 1/2006 Dominiak et al. ................ 95/90
(Continued)

FOREIGN PATENT DOCUMENTS

JP    62-023459 A    1/1987
JP    03-089912 A    4/1991
(Continued)

OTHER PUBLICATIONS

International Search Report in PCT/JP2010/067515 dated Jan. 18, 2011 with English translation thereof.

*Primary Examiner* — Robert Clemente
(74) *Attorney, Agent, or Firm* — McGinn IP Law Group, PLLC (57) ABSTRACT

A dust removal device is provided which reduces the differences, among different dusty environments, in time at which dust collection is started until the time when possible clogging may occur to significantly increase the time from the start of dust collection until the time when possible clogging occur, while improving dust removal performance. The dust removal device includes main filter 10 that is formed of nonwoven cloth 8 with charged fiber, duct 6-1 with main filter 10 disposed therein, sub-filter 11 including a plurality of cylindrical air trunks formed of a charged member, and duct 6-2 with sub-filter 11 disposed therein. Duct 6-1 and duct 6-2 are in communication with each other. In operation, air flows from duct 6-1 to duct 6-2. Main filter 10 in duct 6-1 has a larger vent cross-sectional area than sub-filter 11 in duct 6-2.

10 Claims, 4 Drawing Sheets

(51) Int. Cl.
  *G03B 21/16* (2006.01)
  *B03C 3/017* (2006.01)
  *B03C 3/155* (2006.01)
  *B03C 3/28* (2006.01)

(56) References Cited

U.S. PATENT DOCUMENTS

| | | | |
|---|---|---|---|
| 7,244,292 B2 * | 7/2007 | Kirk et al. | 96/69 |
| 2009/0051882 A1 | 2/2009 | Yoshimura et al. | |
| 2009/0190100 A1 | 7/2009 | Tanaka et al. | |
| 2010/0313532 A1 * | 12/2010 | Stjernfelt et al. | 55/482 |

FOREIGN PATENT DOCUMENTS

| | | |
|---|---|---|
| JP | 04-176310 A | 6/1992 |
| JP | 2000-042323 A | 2/2000 |
| JP | 2001-239116 A | 9/2001 |
| JP | 2004-157347 A | 6/2004 |
| JP | 2008-244340 A | 10/2008 |
| JP | 2009-050755 A | 3/2009 |
| JP | 2009-175404 A | 8/2009 |
| JP | 2010-197575 A | 9/2010 |
| JP | 2010-204342 A | 9/2010 |
| WO | WO 2010/109595 A1 | 9/2010 |

* cited by examiner

DUST REMOVAL DEVICE

TECHNICAL FIELD

The present invention relates to a dust removal device configured to remove dust from air that is sucked into an electronic apparatus.

BACKGROUND ART

For example, projection display apparatuses have more frequently been used in very dusty environments. In a very dusty environment, optical components may be contaminated and thus have reduced illuminance. Hence, a fine air filter is provided at the air intake of a display apparatus to remove dust so that air free from dust is fed into the display apparatus.

However, the fine air filter is likely to clog and disadvantageously requires frequent maintenance work in a very dusty environment. Related art for solving this problem is disclosed in Patent Literature 1 and Patent Literature 2 below.

CITATION LIST

Patent Literature

Patent Literature 1: JP2000-42323A
Patent Literature 2: JP2001-239116A

A device disclosed in Patent Literature 1 uses a filter element including at least two fiber layers with a density gradient varying from a low-density layer to a high-density layer. A viscous portion like a porous film is provided in the uppermost portion of the high-density layer located adjacent to the low-density layer. This device removes larger dust by the low-density layer and collects dust having passed through the low-density layer in the viscous portion. The device collects fine dust having passed through the viscous portion in the high-density layer. Dust with a wide particle size distribution is collected over a wide range from the low-density layer to the high-density layer. This enables clogging of an air filter to be delayed.

A device disclosed in Patent Literature 2 includes cleaning means to clean a filter surface so as to prevent the filter surface from being clogged with dust such as fluffy dust. The cleaning prevents the air filter from clogging, precluding a decrease in dust collection efficiency.

However, the related art poses the following problems.

The device disclosed in Patent Literature 1 can increase the time from when dust collection, covering a wide range of dust particle size, begins until the time possible clogging may occur. However, most of the dust that contains a high proportion of fine dust particles is collected in the high-density layer in a concentrated manner, leading to rapid clogging. Similarly, sand dust with a large particle size and dust containing a lot of fiber with low circularity are mostly collected in the low-density layer in a concentrated manner and thus causes clogging earlier. That is, the time at which dust collection is started until the time at which possible clogging may occur depends on the dusty environment. Thus, the time to carry out maintenance work on the air filter may disadvantageously vary depending on the dusty environment.

On the other hand, the device disclosed in Patent Literature 2 uses the cleaning means to clean the filter surface and is very effective at removing dust such as fluffy dust from the filter. However, while the filter is being cleaned, sand dust that has a small particle size, may swirl around and contaminate optical components. Furthermore, the cleaning is carried out by mechanical means, thus preventing the removal of dust that contains oil or moisture and that is attached firmly to the filter surface. The equipment is thus liable to break down. As is the case with the device disclosed in Patent Literature 1, the time at which dust collection is started until the time at which possible clogging may occur depends on the different kinds of dusty environment. Thus, the time to clean the air filter may disadvantageously vary depending on the dust environment. Since the time when clogging occurs varies, cleaning of the air filter needs to be carried out within the shortest time before clogging is likely to occur.

SUMMARY OF INVENTION

An example of the object of the present invention is reducing differences, among various dusty environments, in the amount of time from that passes from the start of dust collection until the time when possible clogging of the filter occurs, and to significantly increase the amount of time from the start of dust collection until the time when possible clogging of the filter occurs, while improving dust removal performance.

An aspect of the present invention includes a first air filter formed of a non-woven cloth with charged fiber, a first duct with the first air filter disposed therein, a second air filter including a plurality of cylindrical air trunks formed of a charged member, and a second duct with the second air filter disposed therein. Moreover, the first duct and the second duct are in communication with each other, and are used so as to pass air from the first duct to the second duct. Then, the first air filter in the first duct has a larger vent cross-sectional area than the second air filter in the second duct.

DESCRIPTION OF EMBODIMENTS

Now, an exemplary embodiment will be described taking a dust removal device for use in a projection display apparatus as an example. The dust removal device according to the exemplary embodiment is applicable to all electronic apparatuses into which air free from dust is desirably sucked. The dust removal device according to the exemplary embodiment will be described with reference to the drawings.

Figure 1:
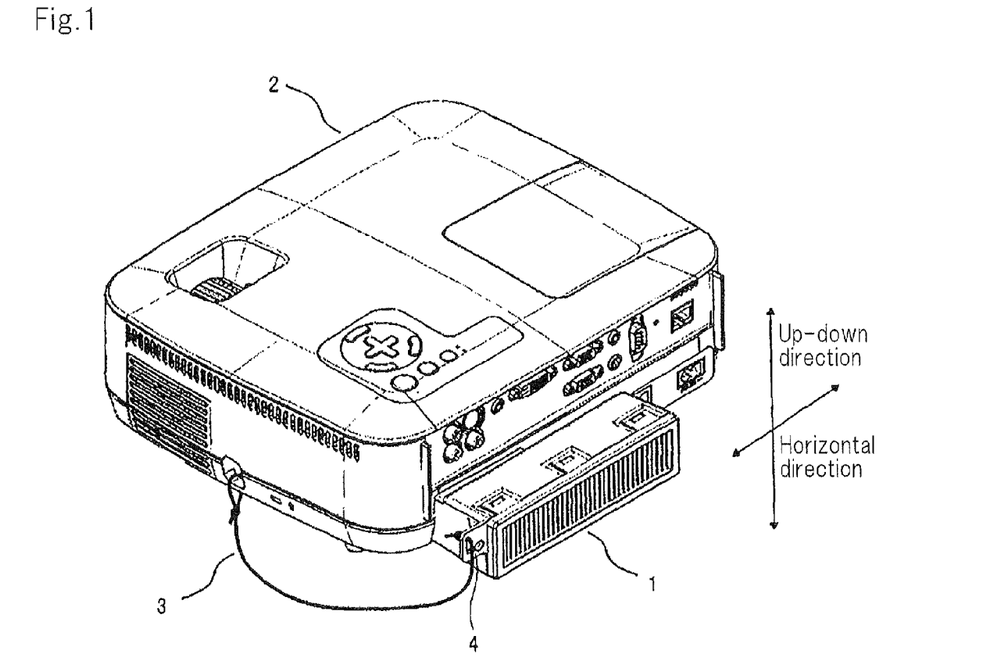
FIG. 1 is a perspective view of a liquid crystal projection display apparatus with a dust removal device according to the present invention attached thereto.

FIG. 1 is a perspective view of a projection display apparatus with the dust removal device according to the exemplary embodiment attached thereto. As shown in FIG. 1, dust removal device 1 is attached to the air intake of projection display apparatus 2. When a cooling fan in the display apparatus performs a suction operation, air that contains dust externally flows into display apparatus 2 via dust removal device 1. Dust removal device 1 includes two air filters (main filter and sub-filter) disposed therein to allow dust that passes through dust removal device 1 to be efficiently removed. Air with dust removed is fed into display apparatus 2 to cool a plurality of optical components such as a liquid crystal display panel.

Dust removal device 1 may be incompletely attached to display apparatus 2 or a cable may come into contact with dust removal device 1. Thus, dust removal device 1 may fall down from display apparatus 2 onto the floor, and the case for dust removal device 1 may be damaged. To prevent this, attachment 4 is provided at the case end of dust removal device 1 so that string 3 can be attached to attachment 4. Attachment 4 and display apparatus 2 are connected together with string 3. When dust removal device 1 is clogged with dust, fall preventing string 3 is removed from attachment 6 so that dust can be cleaned from dust removal device 1 by using a cleaner or the like.

Figure 2:
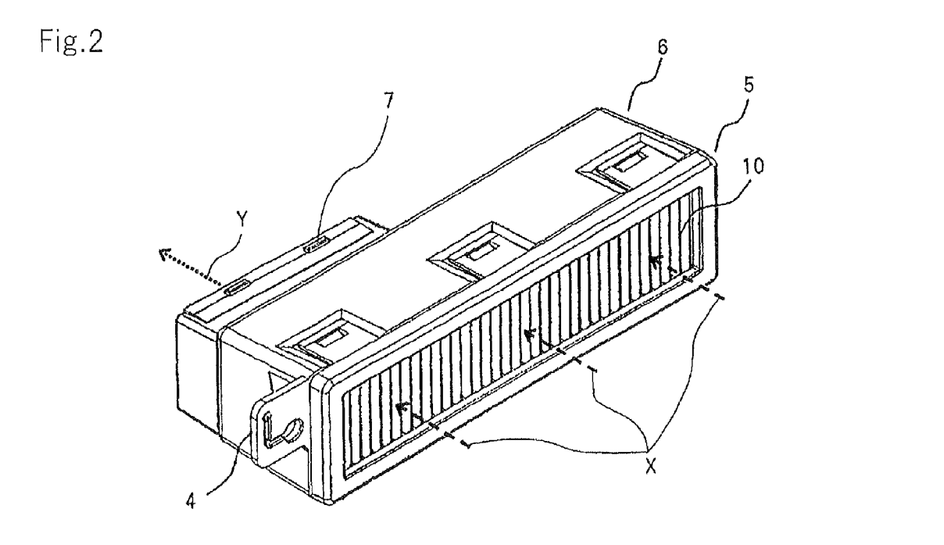
FIG. 2 is an enlarged perspective view of a dust removal device according to an exemplary embodiment.

FIG. 2 shows an enlarged perspective view of dust removal device 1. As shown in FIG. 2, air X that contains dust flows in from front case 5 side of dust removal device 1 (see dashed lines in FIG. 2) and passes through two internal air filters (a main filter and a sub-filter) to remove dust. Air Y with the dust removed therefrom flows from the rear surface of main body case 6 into the display apparatus (see dotted line in FIG. 2).

The outer covering of dust removal device 1 includes front case 5 and main body case 6. Front case 5 and main body case 6 are assembled and integrated together by a structure utilizing pawls and holes into which the pawls are fitted (the structure is hereinafter referred to as a pawl fitting structure). When apparatus attachment 7 that is located behind main body case 6 is fitted into an attachment (not shown in the drawings) of the air intake of display apparatus 2, dust removal device 1 as a whole is held by display apparatus 2.

Figure 3:
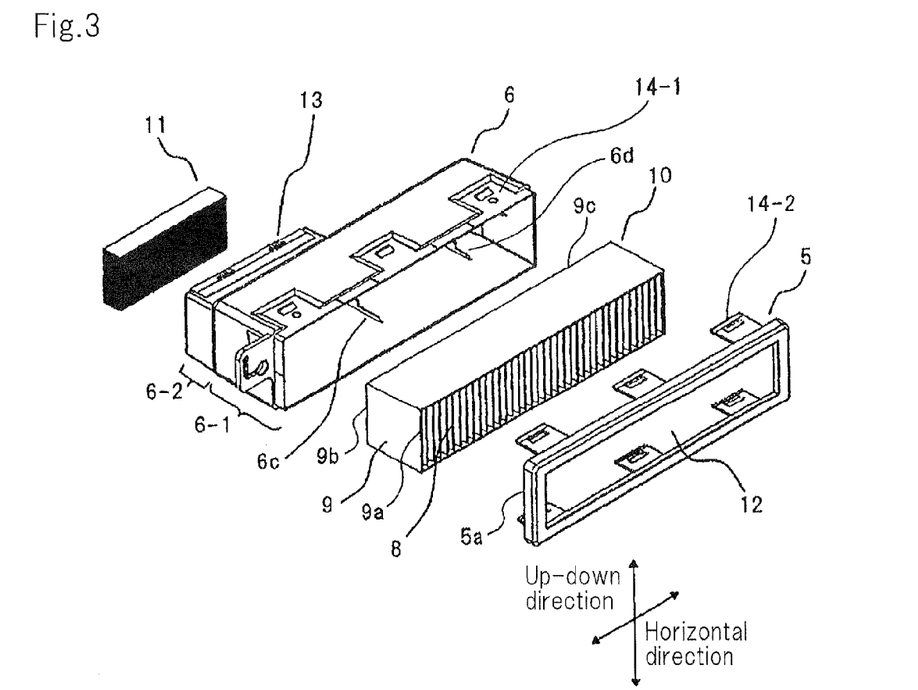
FIG. 3 is an exploded perspective view of the dust removal device according to the exemplary embodiment.

FIG. 3 is an exploded perspective view of dust removal device 1. As shown in FIG. 3, dust removal device 1 in the exemplary embodiment includes front case 5, main body case 6, main filter 10, and sub-filter 11.

Front case 5 includes opening 12 (air inlet) in the center of front case 5.

Main body case 6 has a duct structure. The duct structure is an integral structure in which duct 6-1 with main filter 10 arranged therein and duct 6-2 with sub-filter 11 arranged therein are in communication with each other so that air can be passed between ducts 6-1 and 6-2. Main body case 6 is injection-molded using a mold formed of polycarbonate resin. Duct 6-2 has a vent cross-sectional area equivalent to the cross-sectional area of the air intake of display apparatus 2. Duct 6-1 has a vent cross-sectional area about 2.5 times as large as the vent cross-sectional area of duct 6-2. This size is obtained by enlarging the opening of duct 6-1 in a lateral direction. The "vent cross-sectional area" is a cross-sectional area obtained by cutting the duct along a direction orthogonal to the direction of air inflow. Furthermore, as also described below, main body case 6 includes, on an inner side surface thereof, a plurality of ribs (rib 6c, rib 6d, and others) that position main filter 10 in the lateral direction, in an up-down direction, and in an inward direction, a plurality of ribs (not shown in the drawings) that position sub-filter 11 in the inward direction, and a plurality of holding pins. Main body case 6 includes, on the outer side surface thereof, apparatus connector 13 arranged on display apparatus 2 side to connect to the main body of display apparatus 2 and receiver 14-1 of the pawl fitting structure arranged on the air inflow side to connect to front case 5.

Main filter 10 is configured by pleating non-woven cloth 8 with charged fiber and fixing fixing frame 9 to the periphery of non-woven cloth 8 with an adhesive. Main filter 10 is placed inside duct 6-1, and then front case 5 is attached to main body case 6 from the front side and held on main body case 6. Front case 5 and main body case 6 are integrated together by fitting pawls 14-2 of the pawl fitting structure arranged at the periphery of front case 5 onto receivers 14-1 on main body case 6 side. At this time, front edge 9a of fixing frame 9 comes into complete contact with the inner side surface of flange 5a of front case 5 to prevent air that flows in through opening 12 from passing through fixing frame 9 to the outside. Thus, almost all of the inflow air passes through non-woven cloth 8.

Sub-filter 11 is configured by corrugating a charged sheet-like member so that the resultant sheet-like member has multiple layers. Sub-filter 11 is placed into duct 6-2 of main body case 6 at a side opposite to the side from which main filter 10 is placed into main body case 6.

Figure 4:
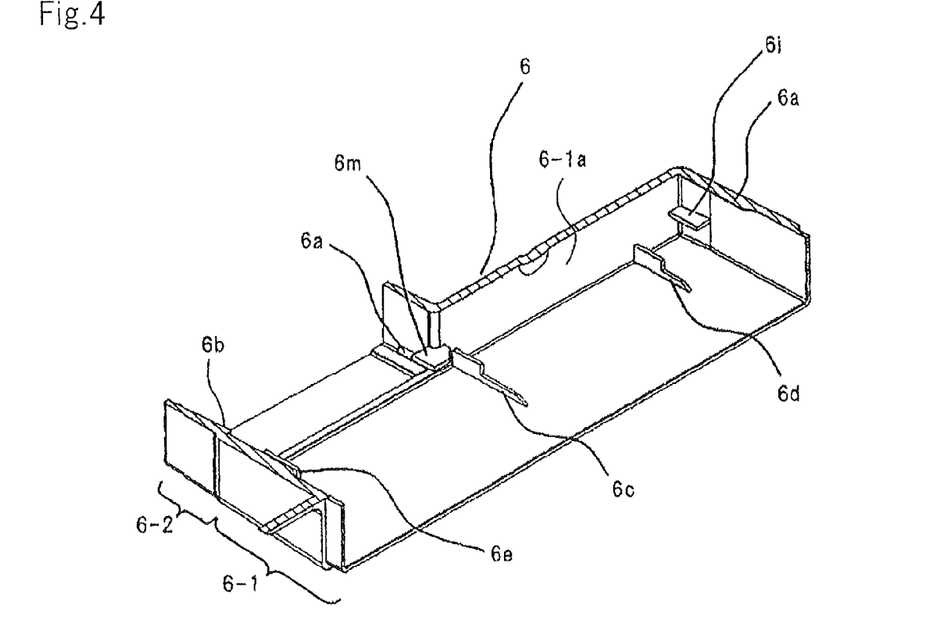
FIG. 4 is a perspective view of a horizontal cross-sectional surface of a bottom surface side of a main body case in FIG. 2 as seen from obliquely above.

FIG. 4 is a perspective view showing a horizontal cross-sectional surface of the bottom surface side portion of main body case 6 in FIG. 3.

When main filter 10 is placed into duct 6-1, the center of main filter 10 in the lateral direction is positioned at the center of duct 6-1 in the lateral direction, while portions of fixing frame 9 corresponding to the right and left ends of main filter come into contact with inclinations of rib 6a and rib 6b located opposite rib 6a in the horizontal direction. At the same time, the center of main filter 10 in the up-down direction is positioned at the center of duct 6-1 in the up-down direction, while portions of fixing frame 9 that correspond to the upper and lower ends of main filter come into contact with inclinations of ribs 6c, 6d, and 6e and ribs 6f, 6g, and 6h (not shown in the drawings) located opposite ribs 6c, 6d, and 6e in the up-down direction.

Moreover, rear edges 9b that position at the right side and the left side of fixing frame 9 of main filter 10 come into contact with four portions, that is, rib 6i and rib 6j (not shown in the drawings) located opposite rib 6i in the horizontal direction and ribs 6k and 6l located opposite ribs 6i and 6j, respectively, in the up-down direction. At the same time, rear edges 9c that position at the upper side and lower side of fixing frame 9 of main filter 10 come into contact with six portions, that is, corners of cutouts formed in ribs 6c, 6d, and 6e and corners of cutouts formed in ribs 6f, 6g, and 6h (not shown in the drawings) located opposite ribs 6c, 6d, and 6e in the up-down direction. This positions main filter 10 inside duct 6-1 in the inward direction.

The rear periphery of fixing frame 9 is thus held by the ribs so that main filter 10 avoids coming into contact with inward inner wall surface 6-1a of duct 6-1. Main filter 10 is accurately centered in duct 6-1 and housed in duct 6-1 without being completely deformed.

On the other hand, when sub-filter 11 is placed into duct 6-2, four pins 6q, 6r, 6s, and 6t (pins 6r, 6s, and 6t are not shown in the drawings) provided on ribs 6m, 6n, 6o, and 6p (ribs 6n, 6o, and 6p are not shown in the drawings), respectively, and that are formed in the vicinity of corners of inner side surfaces of main body case 6 are inserted into cylindrical air trunks in sub-filter 11 to hold sub-filter 11. At this time, ribs 6m, 6n, 6o, and 6p position sub-filter 11 in the inward direction.

Figure 5:
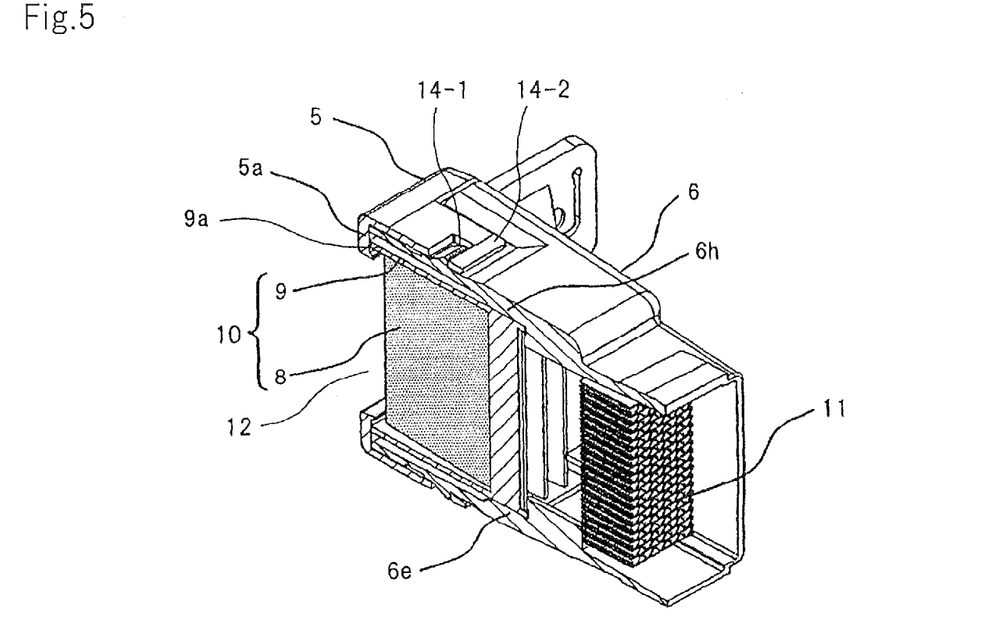
FIG. 5 is a perspective view of the main body case with a main filter and a sub-filter attached thereto as shown in FIG. 2, the perspective view showing the main body case cut along a plane extending through the center of rib 6e in FIG. 4.

FIG. 5 is a perspective view showing main body case 6 with main filter 10 and sub-filter 11 attached thereto as described above, main body case 6 being cut along a plane extending through the center of rib 6e. With reference to FIG. 5, the following will be described: how main filter 10 is held by main body case 6 and prevents air that flows in through opening 12 from passing through fixing frame 9 to the outside.

Main filter 10 is housed in main body case 6 and centered inside main body case 6 in the up-down direction and the lateral direction by the plurality of ribs provided on the inner side surface of main body case 6. When front case 5 is attached to the main body case and integrated with the main body case by using the pawl fitting structure, front edge 9a of fixing frame 9 comes into complete contact with the inner side surface of flange 5a of front case 5. The entire contact between front edge 9a and the inner side surface prevents air that flows in though opening 12 of front case 5 from flowing around to the outer periphery of fixing frame 9. As a result, almost all of the inflow air passes through non-woven cloth 8.

Figure 6:
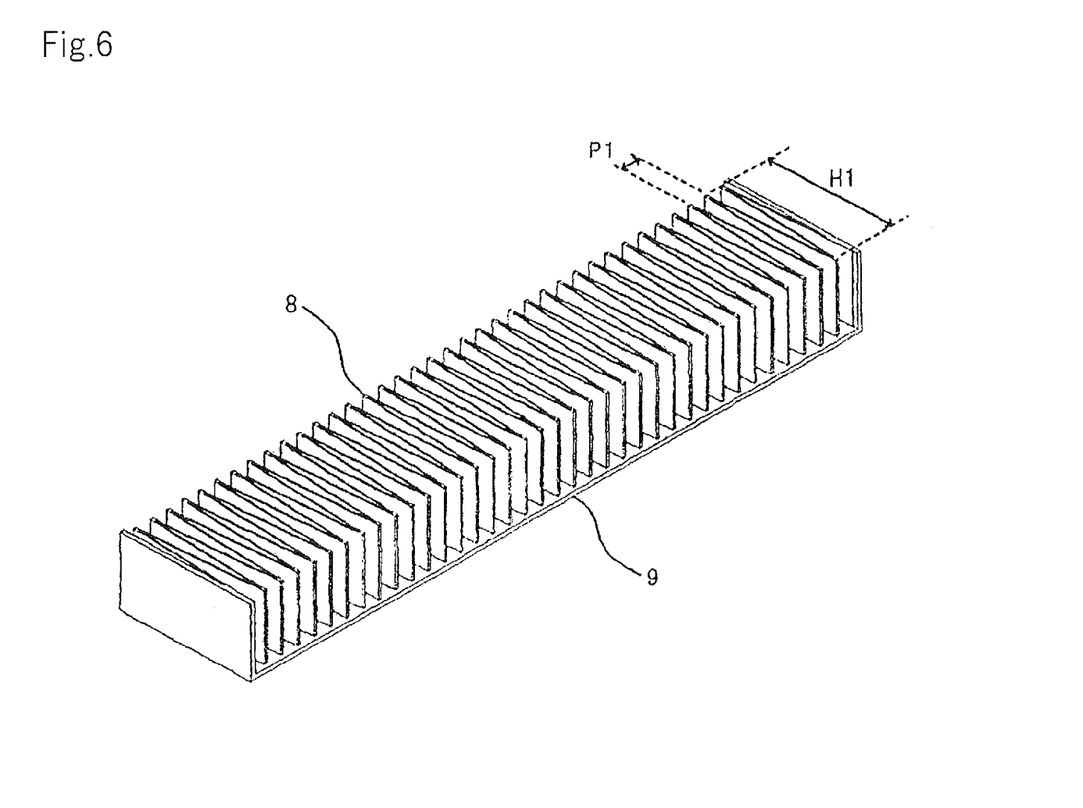
FIG. 6 is a perspective view of a horizontal cross-sectional surface of a bottom surface side portion of the main filter as seen from obliquely above.

FIG. 6 is a perspective view of a horizontal cross-sectional surface of the bottom surface side portion of main filter 10. Non-woven cloth 8 is EFA-24NH manufactured by TOYOBO CO., LTD and formed of charged fiber that has a fiber diameter of about 30 μm and a density of 24 g/m². Non-woven cloth 8 has a peak height H1 of 29 mm and a pitch P1 of 3.5 mm. Non-woven cloth 8 is pleated and then fixed to the inside of fixing frame 9 with an adhesive at the periphery of non-woven cloth 8. Pleated non-woven cloth 8 is folded far in the inward direction of duct 6-1 and alternately folded back at a small pitch so as to extend in the lateral direction. Pleated non-woven cloth 8 thus has a large area.

The following dust is caught and collected in the texture of non-woven cloth 8: fiber dust having a texture size of several tens of μm to several mm, which is larger than the texture size of non-woven cloth 8, and sand dust with a particle size of at least several tens of μm. Fiber dust and sand dust that are at most several tens of μm are attached to and collected in the fiber by a charging effect. The above-described model number is an exemplary embodiment and collection performance can be improved by increasing the fiber density or electric charge amount. For example, a non-woven cloth with a model number EFA-36NH manufactured by TOYOBO CO., LTD. has a larger fiber density than in the exemplary embodiment. The use of the non-woven cloth with this model number enables collection efficiency to be increased by 6%.

Fixing frame 9 according to the exemplary embodiment is formed of paper but may be manufactured by integral molding using a mold formed of a resin. In this case, non-woven cloth 8 can be joined to fixing frame 9 during molding, advantageously eliminating the need for an adhesive. Thus, this manufacturing method is suitable for mass production.

Figure 7:
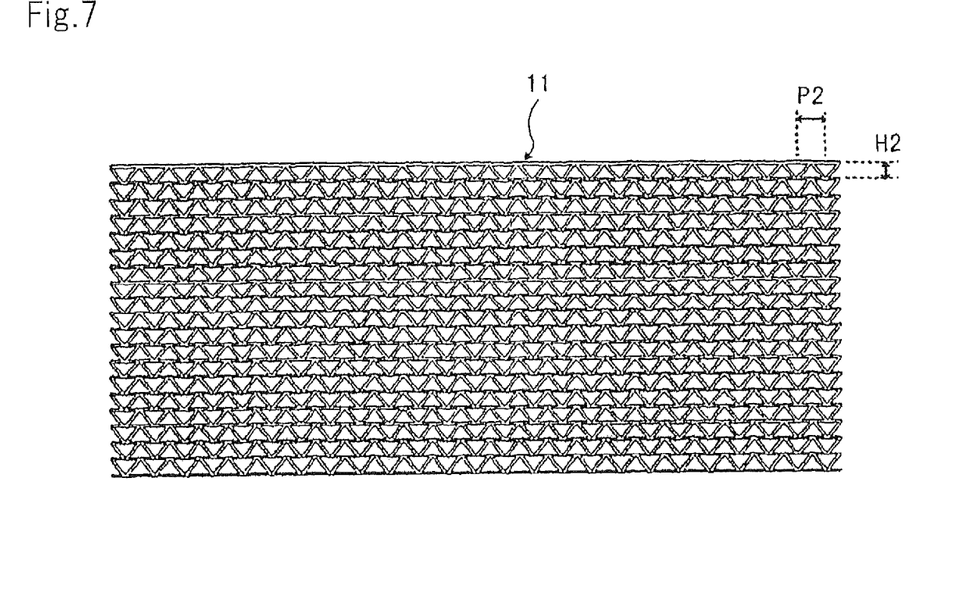
FIG. 7 is a front view of the sub-filter used in the exemplary embodiment.

FIG. 7 shows a front view of sub-filter 11. Sub-filter 11 is HAF70 manufactured by Sumitomo 3M Limited and obtained by corrugating a sheet-like polypropylene film so that the resultant polypropylene film includes multiple layers with a peak height H2 of about 1.3 mm and a pitch P2 of about 3.5 mm. Specifically, corrugated flutes (corrugated sheets) and liners (plate-like sheets) are alternately laminated to form a plurality of cylindrical air trunks with a substantially mountain-like vent cross-sectional surface. This structure is sometimes referred to as a honeycomb structure. Such a cylindrical air trunk structure is characterized by reduced pressure loss suffered by the filter during ventilation. Furthermore, the wall surface of the cylindrical air trunks that are formed of sheet-like film is charged. Upon passing through the cylindrical air trunks, the dust is electrically attracted to the wall surface and collected.

The above-described two air filters (the air filter that is formed of a pleated non-woven cloth as shown in FIG. 6 and the air filter that is formed of a corrugated film as shown in FIG. 7) are conventionally used to prevent dust from flowing into electronic products. However, each of these air filters pose the following problems.

For the air filter that is formed of a pleated non-woven cloth, improvement of the collection performance a requires finer texture or a plurality of filters that form multiple stages with different degree of fineness. The former configuration disadvantageously results in increased ventilation resistance and thus significantly reduced air volume. In an environment much containing small dust, the latter configuration collects most of the dust in a fine filter in a concentrated manner, disadvantageously leading to rapid clogging.

The air filter that is obtained by corrugating a film-like charge member so that the air filter includes multiple layers poses the following problems. In an environment much containing dust that is larger than the open width of the cylindrical air trunk, fiber is two-dimensionally collected on the front surface of the cylindrical air trunk and behaves like an air filter. This may disadvantageously cause rapid clogging. In an environment much containing dust, such as sand dust, which is smaller than the open width of the cylindrical air trunk, the dust is collected on the wall surface of the cylindrical air trunk by the charging effect, and the air filter is thus unlikely to be clogged. However, a given amount of dust adhering to the wall surface of the cylindrical air trunk degrades the collection effect. To prevent this, cleaning is carried out based on a change in the color of the air filter. However, when to carry out cleaning depends on the user's judgment. Hence, disadvantageously, the air filter may fail to be cleaned, or when the dust is similar to the air filter in color, when to carry out cleaning may be erroneously determined and the air filter may continue to be used.

Thus, according to the present invention, the main filter formed of the pleated non-woven cloth (FIG. 6) is arranged on an upstream side in the direction in which air flows into display apparatus 2. Furthermore, the sub-filter corrugated so as to include multiple layers (FIG. 7) is arranged downstream of main filter 10 in the same direction. Moreover, the area of non-woven cloth 8 in main filter 10 which occupies opening 12 is set to be larger than the vent cross-sectional surface of sub-filter 11. The present invention uses such a configuration to solve the above-described problems.

That is, sub-filter 11 with the plurality of cylindrical air trunks formed therein is arranged downstream of main filter 10 in the direction in which air flows into display apparatus 2. This allows dust to be collected by the charging effect, enabling improvement in collection performance. Sub-filter 11 serves to eliminate the need to make the texture of main filter 10 finer, thus preventing an increase in ventilation resistance. Most of the dust reaching sub-filter 11 is sand dust of at most several tens of μm in size having passed through main filter 10. Thus, sub-filter 10 is not clogged with such dust. Fiber dust ranging from several tens of μm to several mm and sand dust with a particle size of at least several tens of μm are caught and collected in non-woven cloth 8 in main filter 10. Thus, clogging inevitably occurs on main filter 10 side. As a result, the filter is cleaned at almost regular time intervals.

Figure 8:
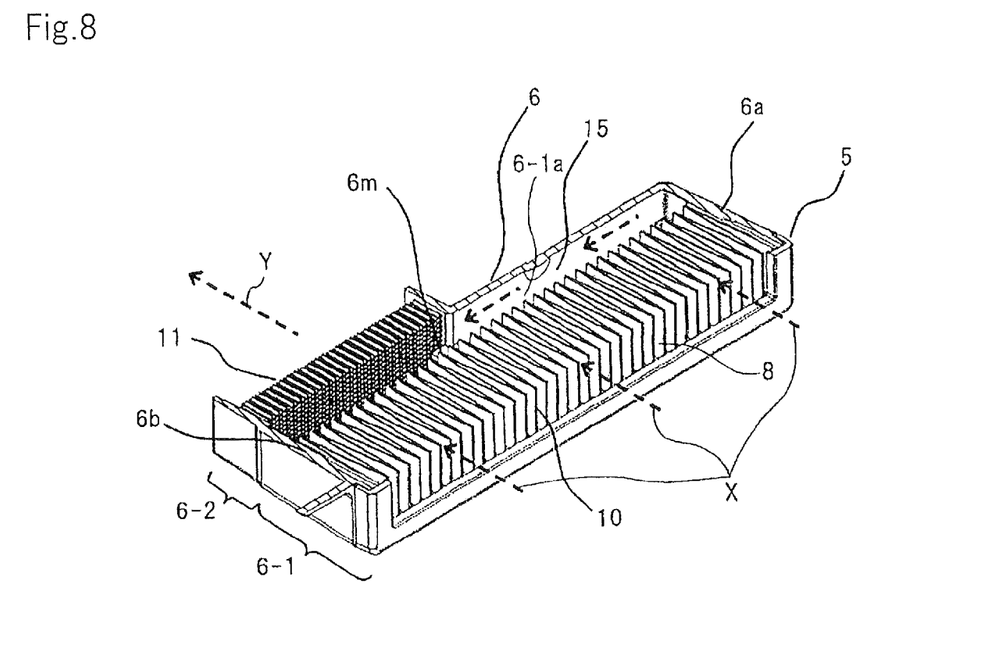
FIG. 8 is a perspective view of a horizontal cross-sectional surface of a bottom surface side portion of the dust removal device according to the exemplary embodiment as seen from obliquely above.

FIG. 8 shows a perspective view of a horizontal cross-sectional surface of the bottom surface side portion of dust removal device 1 in FIG. 2. As shown in FIG. 8, air X that contains dust flows into and passes through main filter 10 and is guided along inward inner wall surface 6-1a of main body case 6 and air layer 15 to sub-filter 11. Air Y free from dust flows into the display apparatus via sub-filter 11. Air layer 15 that is 8 mm in size is provided downstream of main filter 10 in the direction in which air flows into display apparatus 2 and between main filter 10 and inward inner wall surface 6-1a of main body case 6. Air layer 15 serves mainly to prevent an increase in ventilation resistance. Sand dust with a small particle size having passed through main filter 10 falls into the space or attaches to inner wall surface 6-1a of main body case 6, thus improving collection performance. Duct 6-1 has a much larger open width than duct 6-2 in the lateral direction, thus enabling a significant increase in the area of the non-woven cloth in main filter 10 which occupies opening 12. An existing air filter is also provided in projection display apparatus 2 with dust removal device 1 according to the exemplary embodiment attached thereto. However, the above-described much larger open width has increased filter area by a factor of nine. As a result, the average velocity of air passing through non-woven cloth 8 decreases to one-ninth. This has successfully increased dust collection efficiency by 15% and also made the time at which dust collection is started until the time at which clogging may possibly occur longer by a factor of about eight.

When used in a plurality of dusty environments with different biases in the particle size distribution or in a dusty environment with dust containing oil or moisture, the above-described configuration has successfully enabled reducing the difference, among different dusty environments, in the amount of time that passes from the start of dust collection until the time when possible clogging of the filter occurs compared to the related art. Moreover, the time from the start of dust collection until the time when possible clogging occurs has been successfully extended, and at the same time, dust removal performance has been successfully improved.

The present invention has been described with reference to the exemplary embodiment, but is not limited the above-described exemplary embodiment. Various changes understandable for those skilled in the art may be made to the construction and details of the present invention without departing from the scope of technical concepts according to the present invention.

REFERENCE SIGNS LIST

1 Dust removal device
2 Projection display apparatus
3 Fall preventing string
4 Fall preventing string attachment
5 Front case
6 Main body case
6-1, 6-2 Ducts
6a, 6b, 6c, 6d, 6e, 6h, 6i, 6m Ribs
6q Pin
7 Apparatus attachment to display apparatus
8 Non-woven cloth
9 Fixing frame
9a Front edge
9b Rear edge in lateral direction
9c Rear edge in up-down direction
10 Main filter
11 Sub-filter
12 Opening
13 Apparatus connector to display apparatus
14-1 Receiver
14-2 Pawl
15 Air layer

The invention claimed is:

1. A dust removal device comprising:
  a first air filter formed of a non-woven cloth with charged fiber;
  a first duct with said first air filter disposed therein;
  a second air filter including a plurality of cylindrical air trunks formed of a charged member; and
  a second duct with said second air filter disposed therein, wherein:
  said first duct and said second duct are in communication with each other,
  said first duct and said second duct are used so as to pass air from said first duct to said second duct, and
  said first air filter in said first duct has a larger vent cross-sectional area than said second air filter in said second duct.

2. The dust removal device according to claim 1, wherein
  the non-woven cloth in the first air filter, in which non-woven cloth is pleated, is fixed at an outer periphery thereof by a frame material,
  an inner side surface of said first duct comes into contact with at least a part of the frame material to hold said first air filter,
  the plurality of cylindrical air trunks in said second air filter are formed by corrugating a charged sheet-like member in such a manner that the resultant sheet-like member comprises multiple layers or a honeycomb structure, and
  an inner side surface of said second duct comes into contact with at least a part of the member forming the cylindrical air trunks to hold said second air filter.

3. The dust removal device according to claim 2, further comprising a plurality of rib structures on the inner side surface of said first duct,
  wherein said rib structures come into contact with a part of the frame material for said first air filter to hold said first air filter.

4. The dust removal device according to claim 3, wherein
  a part of each of said rib structures comprises a cutout, and cutouts of said rib structures come into contact with an end of frame material located downstream of said first air filter in a ventilation direction to hold said first air filter.

5. The dust removal device according to claim 2, further comprising a front case including a flange arranged upstream of said first duct in the ventilation direction,
  wherein a part of said front case and a part of an outer side surface of said first duct each comprise a pawl fitting structure, and
  a part of the flange of said front case comes into contact with an end of the frame material located upstream of said first air filter in the ventilation direction.

6. The dust removal device according to claim 2, further comprising a plurality of pin structures on the inner side surface of said second duct,
  wherein said pin structures come into contact with a part of a wall surface of the cylindrical air trunks in said second air filter to hold said second air filter.

7. The dust removal device according to claim 1, further comprising an air layer between said first air filter and said second air filter.

8. The dust removal device according to claim 1, further comprising a plurality of rib structures on the inner side surface of said first duct,
  wherein said rib structures come into contact with a part of the frame material for said first air filter to hold said first air filter.

9. The dust removal device according to claim 8, wherein
  a part of each of said rib structures comprises a cutout, and cutouts of said rib structures come into contact with an end of frame material located downstream of said first air filter in a ventilation direction to hold said first air filter.

10. The dust removal device according to claim 8, further comprising a plurality of pin structures on the inner side surface of said second duct,
   wherein said pin structures come into contact with a part of a wall surface of the cylindrical air trunks in said second air filter to hold said second air filter.

\* \* \* \* \*